(12) United States Patent
Iida

(10) Patent No.: US 6,671,063 B1
(45) Date of Patent: Dec. 30, 2003

(54) NETWORK FACSIMILE APPARATUS

(75) Inventor: Junichi Iida, Yokohama (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 0 days.

(21) Appl. No.: 09/343,393

(22) Filed: Jun. 30, 1999

(30) Foreign Application Priority Data

Jan. 27, 1999 (JP) .................................... 11-018930

(51) Int. Cl.⁷ ........................... H04N 1/00; G06F 15/00
(52) U.S. Cl. ...................... 358/1.15; 358/402; 358/407; 379/100.12; 709/239
(58) Field of Search ............................... 358/1.15, 402, 358/442, 444, 404, 468, 400, 401, 403, 407; 379/100.01, 100.12, 100.13, 100.15; 709/206, 238, 239

(56) References Cited

U.S. PATENT DOCUMENTS

| | | | |
|---|---|---|---|
| 5,559,721 A | | 9/1996 | Ishii .................... 364/514 R |
| 5,608,874 A | * | 3/1997 | Ogawa et al. .............. 709/246 |
| 5,675,507 A | | 10/1997 | Bobo, II ................. 364/514 R |
| 5,848,137 A | | 12/1998 | Hsiao .................... 379/110.01 |
| 5,870,089 A | * | 2/1999 | Fabbio et al. .............. 345/335 |
| 5,881,233 A | | 3/1999 | Toyoda et al. ........... 395/200.98 |
| 6,023,345 A | * | 2/2000 | Bloomfield ................ 358/402 |
| 6,023,478 A | * | 2/2000 | Kilk et al. ................ 370/535 |
| 6,104,500 A | * | 8/2000 | Alam et al. .............. 358/1.15 |
| 6,266,150 B1 | * | 7/2001 | Brossman et al. ......... 358/1.15 |
| 6,374,291 B1 | * | 4/2002 | Ishibashi et al. ........... 709/206 |
| 6,437,875 B1 | * | 8/2002 | Unno ...................... 358/1.16 |

FOREIGN PATENT DOCUMENTS

| | | |
|---|---|---|
| EP | 0789479 | 8/1997 |
| EP | 0835011 | 4/1998 |
| JP | 9-163064 | 6/1997 |
| JP | 10-107836 | 4/1998 |
| JP | 10-191010 | 7/1998 |
| JP | 10-228428 | 8/1998 |
| JP | 10-247179 | 9/1998 |
| JP | 10-260924 | 9/1998 |
| JP | 10-326288 | 12/1998 |
| WO | 97/38510 | 10/1997 |

OTHER PUBLICATIONS

English Language Abstract of WO 97/38510.
English Language Abstract of JP 10–247179.
English Language Abstract of JP 10–107836.
English Language Abstract of JP 9–163064.
English Language Abstract of JP 10–260924.
English Language Abstract of JP 10–326288.
English Language Abstract of JP 10–228428.
English Language Abstract of JP 10–191010.

* cited by examiner

Primary Examiner—Edward Coles
Assistant Examiner—Joseph R. Pokrzywa
(74) Attorney, Agent, or Firm—Greenblum & Bernstein, P.L.C.

(57) ABSTRACT

In this communication system, a terminal is connected through a network to a network facsimile apparatus which is a network connection type and has communication and printing functions, a printer driver for the network facsimile at the terminal directly receives various instructions (transmission, printing and registration) for a document opened at the terminal to transfer the instruction and the document to the network facsimile apparatus, and the network facsimile apparatus transmits the document which is instructed to transmit using the communication function.

10 Claims, 8 Drawing Sheets

NETWORK FACSIMILE APPARATUS

BACKGROUND OF THE INVENTION

1. Field of the Invention

The present invention relates to a network facsimile apparatus capable of performing transmission and reception of facsimile data and e-mail data connecting to a PSTN and a network such as the internet or LAN.

2. Description of the Related Art

Recently, a method of reusing facsimile received data by combining an internet FAX and a WWW server has been proposed. The method utilizes the function of the internet FAX which converts data received from the PSTN into an e-mail.

FIG. 1 illustrates a system structure of the case of performing facsimile transmission and reception using an internet FAX and a WWW server.

Image data received at internet FAX 1101 via the PSTN is converted into an attached file format to an e-mail at internet FAX 1101 and is transmitted to WWW server 1103 as an attached file of e-mail.

The e-mail with the attached file transferred from internet FAX 1101 is received at e-mail server 1102 via a network. The e-mail with the attached file received at e-mail server 1102 is transferred to WWW server 1103 that is a destination again via the network.

WWW server 1103 stores the attached file of e-mail as image data to link to a homepage for facsimile reception. The storage of facsimile received data is finished at this point.

In order to fetch received data into client machine 1104, a user starts a WWW browser at client machine 1104 and accesses to the homepage for facsimile reception at WWW server 1103. The user reads out an image data file at client machine 1104 via the network from WWW server 1103.

As described above, internet FAX 1101 has a facsimile communication function, an e-mail communication function, a format converting function for converting a format mutually between facsimile and e-mail. Internet FAX 1101 also has a scanning function and a printing function to function alone as a facsimile apparatus. Accordingly, client machine 1104 is able to use internet FAX 1101 as a relay apparatus when transmits an e-mail to internet FAX 1101, and also use internet FAX 1101 as a network printer.

However, there is a problem on the workability in the above system because a user has to start up e-mail software at a client machine to attach a word-processor-document to an e-mail when transmits the word-processor-document generated at the client machine to another terminal through the internet FAX or prints the word-processor-document at the internet FAX.

SUMMARY OF THE INVENTION

An object of the present invention is to provide a communication system for enabling a user to directly transmit or print a word-processor-document generated at a client machine only by providing an instruction of printing or transmission to a printer driver at the client machine without converting the word-processor-document opened at the client machine into an e-mail.

The present invention provides a network facsimile apparatus and a computer system in which a terminal is via a network connected to a network facsimile apparatus which is a network connection type and has communication and printing functions, a printer driver for the network facsimile apparatus directly receives a transmission instruction of a document opened at the terminal in order to transfer the transmission instruction and the document to the network facsimile apparatus, and the network facsimile apparatus transmits the document which is instructed to transmit using the communication function.

According to the aforementioned processing, a transmission instruction of a document opened at the client is directly provided to a printer driver for the network facsimile apparatus and transferred to the network facsimile apparatus, thereby a user is able to transmit the document at the terminal to a desired destination by transferring the document to the network facsimile apparatus in the similar procedure as printing.

In addition, when a printer driver for the network facsimile apparatus receives a printing instruction of a document opened at a terminal, the printer driver transfers the printing instruction and the document to the network facsimile apparatus and prints the document which is instructed to print using the printing function. According to the aforementioned processing, it is possible to transmit document opened at the terminal to the network facsimile apparatus to print, thus enabling the network facsimile apparatus to be used as a network printer.

In addition, the network facsimile apparatus has a storage for storing a document, another storage in which a bulletin board including a document list of stored documents is stored in structured document format, and a web server for enabling the bulletin board to be browsed. When the printer driver for the network facsimile apparatus receives a registration instruction of a document opened at the terminal, the printer driver transfers the registration instruction and the document to the network facsimile apparatus. The network facsimile stores the document which is instructed to register in the storage, while registers the document name to the document list of the bulletin board. A user is thereby able to directly transmit the document at the terminal to the network facsimile apparatus only by operating the almost same procedure as printing. Since the bulletin board is constructed in structured document, it is possible to browse the bulletin board at the user terminal where the document is generated by accessing to the network facsimile with URL and providing a file request to a web server.

In addition, the printer driver for the network facsimile apparatus displays a selection page including at least printing and transmission as instruction items at the terminal, and receives an enter of the instruction item on the selection page, thereby enabling various instructions including printing or transmission to be easily entered.

In addition, the selection page has a box adapted to enter a facsimile number and e-mail address corresponding to a transmission instruction. According to the aforementioned feature, it is possible to enter destination information in the same page as selecting the instruction item, improving the workability.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF PREFERRED EMBODIMENT

An embodiment of the present invention will be described in detail with reference to drawings.

Figure 1:
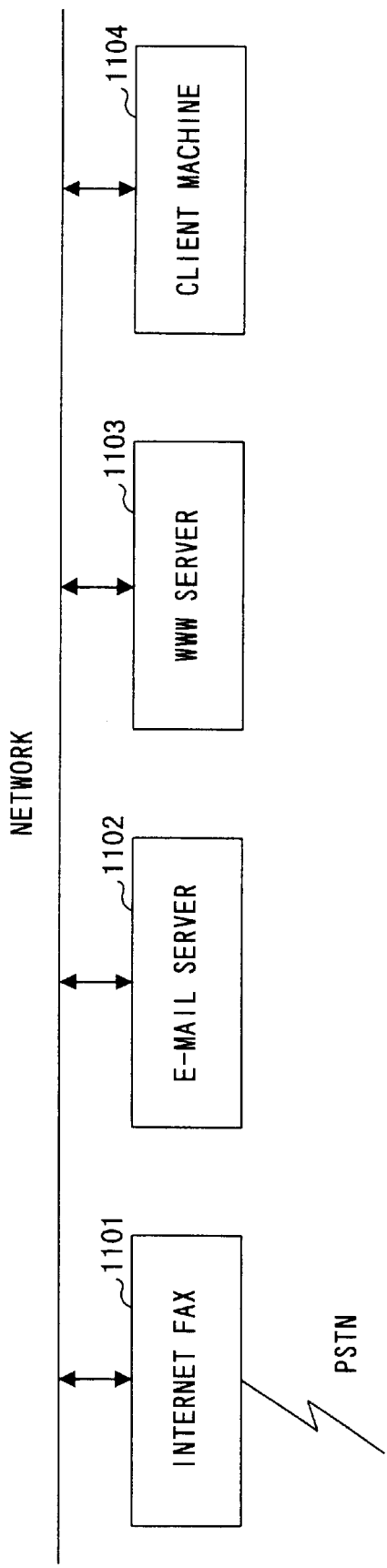
FIG. 1 is a configuration diagram of facsimile transmission and reception system using an internet FAX and a WWW server.
Figure 2:
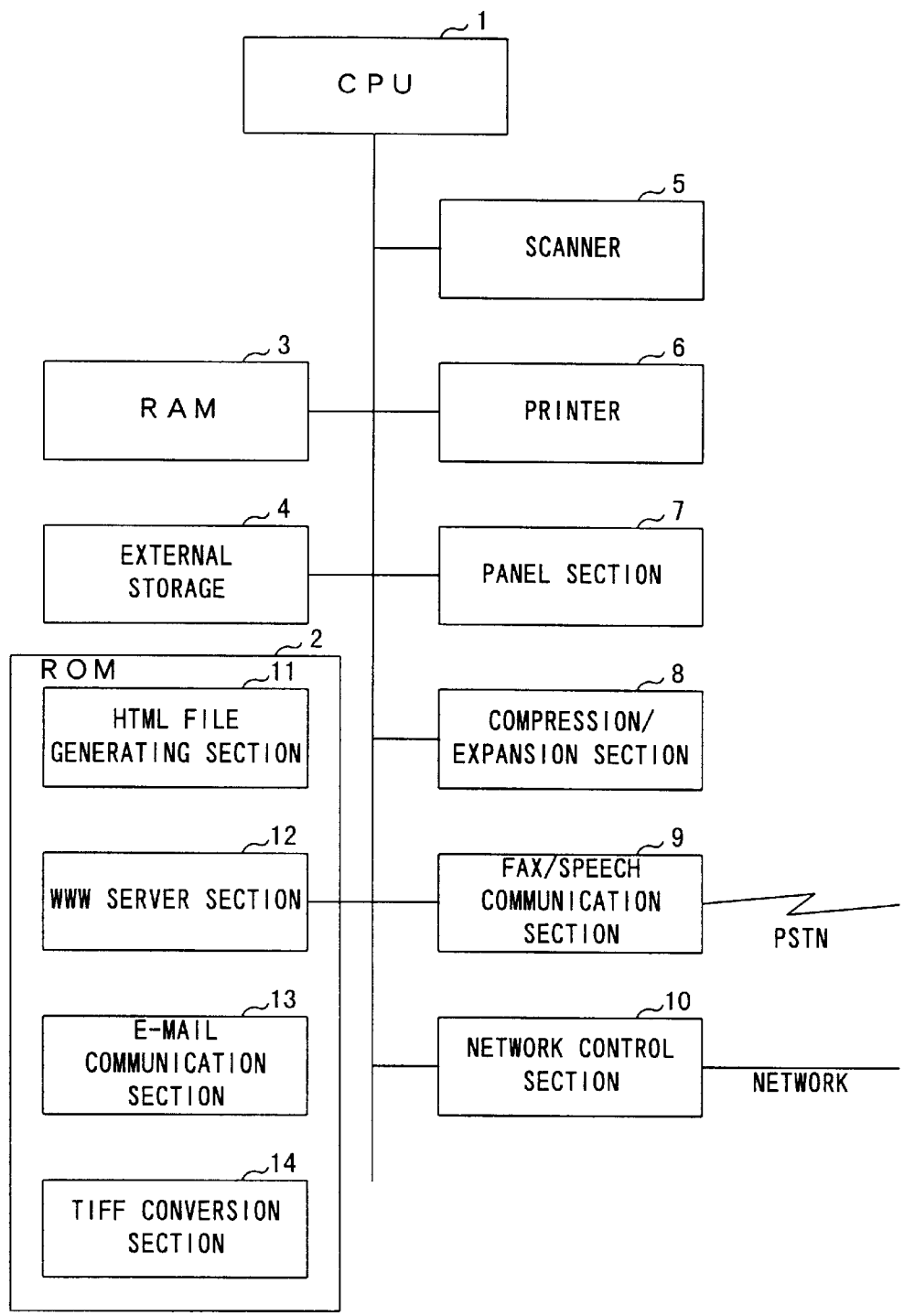
FIG. 2 is a function block diagram of a network facsimile apparatus according to an embodiment of the present invention.

FIG. 2 illustrates a function block diagram of a network facsimile apparatus according to this embodiment. ROM 2, RAM 3 and external storage 4 are connected to CPU 1 that operates by an operating system and is accessible to ROM 2, RAM 3 and external storage 4. Various programs such as processing program for a server side are stored in ROM 2. RAM 3 is used, for example, as a working area of programs stored in ROM 2. Compressed image data and HTML files are stored in external storage 4.

In addition, the network facsimile apparatus according to this embodiment has scanner 5, printer 6, panel section 7, compression/decompression section 8, FAX/speech communication section 9 and network control section 10 which operate under the control of CPU 1.

The network facsimile apparatus performs scanning of image data of, for example, document by scanner 5, and performs printing of scanned imaged and received image data at printer 6. A user is able to perform operations such as an instruction to scan image data and an enter of destination address using panel section 7. Compression/expansion section 8 performs expansion of received image data and compression of scanned image data. FAX/speech communication section 9 performs facsimile communication and speech communication connecting to a PSTN. Network control section 10 performs a control over data communication including e-mail connecting to a network.

The programs stored in ROM 2 include each program for HTML file generating section 11, WWW server section 12, e-mail communication section 13 and TIFF conversion section 14. Although each function of HTML file generating section 11, WWW server section 12, e-mail communication section 13 and TIFF conversion section 14 is provided under the respective program executed by CPU 1, the respective function will be described using respective numeral symbol provided to the respective program as illustrated in FIG. 2 as a matter of accommodation.

HTML file generating section 11 is a function block that converts lists of image data received by facsimile and e-mail and other data into HTML files readable on a homepage to register to a server.

WWW server section 12 provides a server function of, for example, performing communication with a WWW browser in accordance with HTTP protocol to exchange homepage data (HTML file)

E-mail communication section 13 performs transmission and reception of e-mail via a network, while functions as an e-mail server. In addition, TIFF conversion section 14 provides a function of converting coded facsimile data and document file data into TIFF format. In the case of transmitting facsimile data by e-mail, TIFF conversion section 14 converts the facsimile data into TIFF format and generates an e-mail which contains the TIFF file as an attached file. In other words, the TIFF file is text-coded, and provided to a data section for an e-mail with attached file conforming to, for example, MIME. On the contrary, in the case of transmitting data received by e-mail by facsimile, an e-mail in text code is subjected to binary conversion and further converted into a TIFF file. TIFF conversion section 14 opens the TIFF file. When the file is a non-compressed, compression/expansion section 8 provides compression processing such as MH, and then the resultant data is transmitted.

Figure 3:
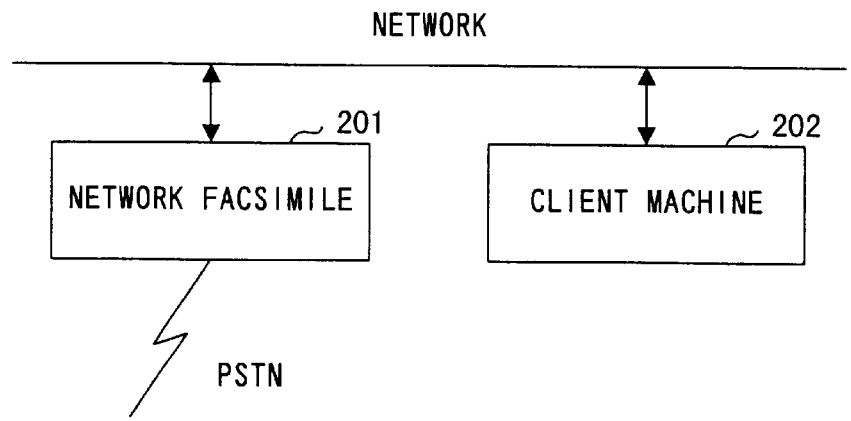
FIG. 3 is a configuration diagram of a system in which the network facsimile apparatus according to the above embodiment is connected to a client machine.

FIG. 3 illustrates a system configuration in the case of connecting a network facsimile apparatus according to this embodiment to a PSTN and a network. In FIG.3, network facsimile apparatus 201 is connected to the PSTN while connected to the network through a network interface. It is possible to browse at client machine 202 a homepage provided at network facsimile apparatus 201 by operating a WWW browser at client machine 202. In addition, printer driver 203 is installed at client machine 202 to use network facsimile apparatus 201 as a network printer.

Figure 4:
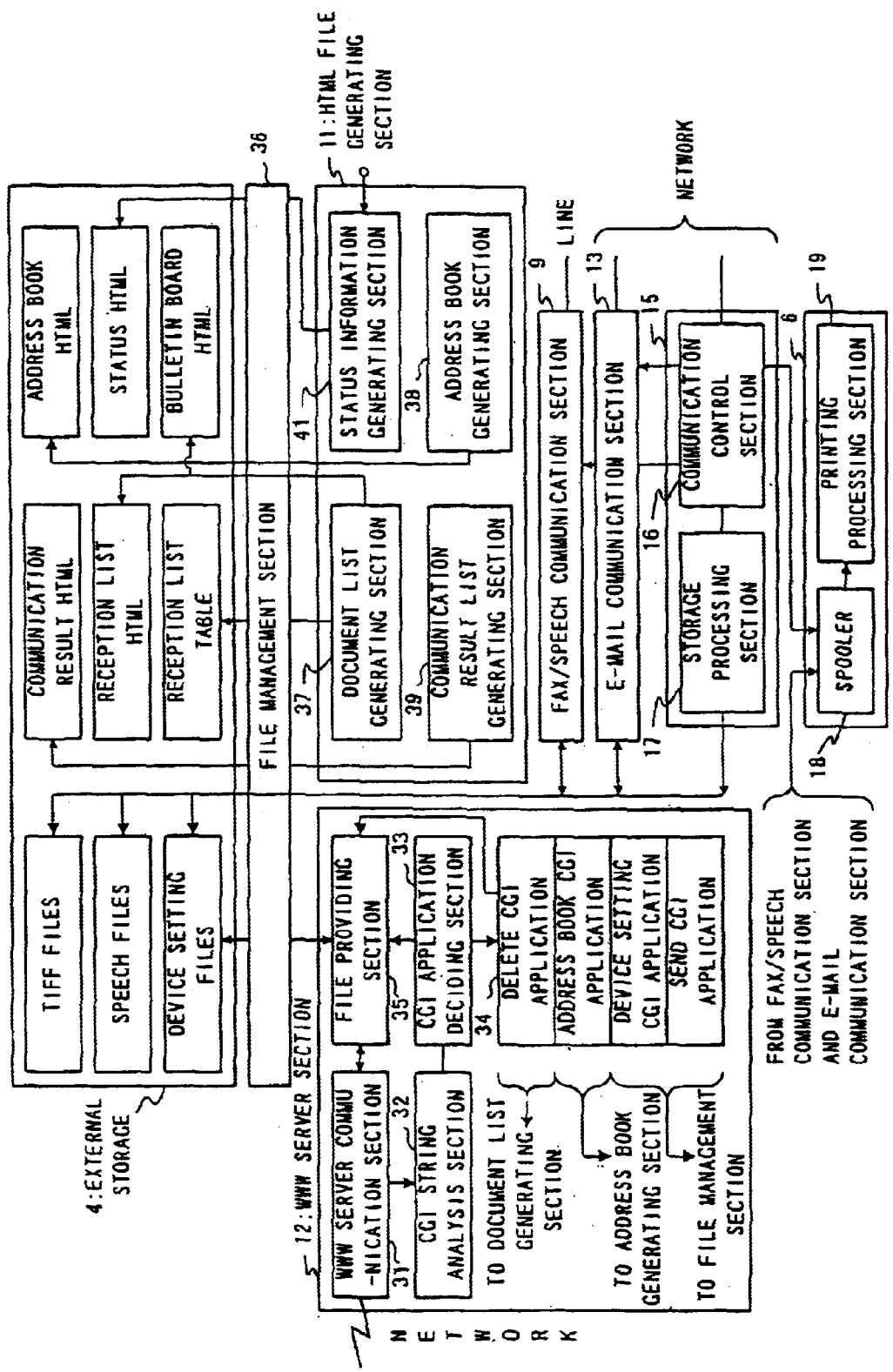
FIG. 4 is a function block diagram illustrating a flow of a part of processing in the network facsimile apparatus according to the above embodiment.

FIG. 4 illustrates a function block diagram for HTML file generating section 11, WWW server section 12, e-mail communication section 13, TIFF conversion section 14, network daemon 15 and printer 6, and a flow of data processing between the blocks.

In WWW server section 12, WWW server communication section 31 communicates with a WWW browser operating at client machine 202 in accordance with HTTP protocol. A command received at WWW server communication section 31 from client machine 202 is analyzed at CGI string analysis section 32.

CGI string analysis section 32 analyzes a CGI string contained in the received data, provides the analyzed result to CGI application deciding section 33 to start corresponding CGI application 34. CGI application 34 executes the predetermined processing using the received data. CGI application 34 includes applications for, for example, transmission, delete of HTML document, generation of address book, and device setting.

File providing section 35 receives a file, whose file request is provided from client machine 202, from file management section 36 to provide to WWW server communication section 31. When the file request does not requires the CGI processing, file providing section 35 requires a corresponding file to file management section 36.

HTML file generating section 11 has document list generating section 37 that generates a HTML file of document list and address book generating section 38 that generates a HTML file of address book.

Document list generating section 37 generates a HTML file of reception list indicative of received e-mail and received FAX and performs a delete, edit and move of a part of the HTML file according to an instruction provided from CGI application 34 and received data.

Address book generating section 38 modifies the HTML file of address book according to an instruction from the address book CGI application and received data. Further, address book generating section 38 executes processing to incorporate the latest address table data into the HTML file of address book when power is turned on and the content of the address book is changed.

In addition, HTML file generating section 11 has communication result list generating section 39 and status information generating section 41. Communication result list generating section 39 receives log information indicative of communication result from FAX/speech communication section 9 and e-mail communication section 13 to generate and update the HTML file indicative of the communication result list. Status information generating section 41 fetches status signals indicative of respective status from scanner 5, printer 6, panel section 7 and FAX/speech communication section 9 (for example, eruption of paper stack, lack of toner and on-communication) to generate and update a HTML file in which the respective statuses are registered.

FAX/speech communication section 9 receives an instruction of transmission processing, transmission document number, a FAX number of a destination terminal from a send CGI application. When the transmission document number is provided, FAX/speech communication section 9 fetches transmission data (image) of the corresponding document number from external storage 4, inputs the image data to a transmission buffer, and transmits the data to the FAX number of the destination terminal connecting to the PSTN. In the case of simultaneous transmission, a plurality of FAX numbers are spooled from the send CGI application as simultaneous transmission destinations. A transmission instruction, a FAX number, and a document number are provided from network printer daemon 15. FAX/speech communication section 9 fetches data corresponding to the document number from external storage 4 to transmit to a designated FAX number.

E-mail communication section 13 receives an instruction of transmission processing, transmission document number, an e-mail address of a destination terminal from a send CGI application. When the transmission document number is provided, e-mail communication section 13 fetches transmission data of the corresponding document number from external storage 4, inputs the image data to a transmission buffer, and transmits the data to the e-mail address of the destination terminal connecting to a network such as the internet by a LAN or dial up. In the case of simultaneous transmission, a plurality of e-mail addresses are spooled from the send CGI application as simultaneous transmission destinations. A transmission instruction, an e-mail address, and a document number are provided from network printer daemon 15. E-mail communication section 13 fetches data corresponding to the document number from external storage 4, and attaches the data to an e-mail to transmit to a designated e-mail address.

Network printer daemon 15 is one of functions included in network control section 10, and has communication control section 16 and storage processing section 17. Communication control section 16 waits for a request from a printer driver and receives a printing request, transmission request and registration request. Network printer daemon 15 transfers data to printer 6 in the case of printing request, provides data to FAX/speech communication section 9 or e-mail communication section 13 in the case of transmission request, and provides data to storage processing section 17 to store in external storage 4 in the case of registration request.

Printer 6 has spooler 18 for spooling a printing request and printing data and printing processing section 19 for executing printing processing. Printing processing is spooled from Network printer daemon 15, FAX/speech communication section 9 and e-mail communication section 13 to spooler 18.

Figure 5:
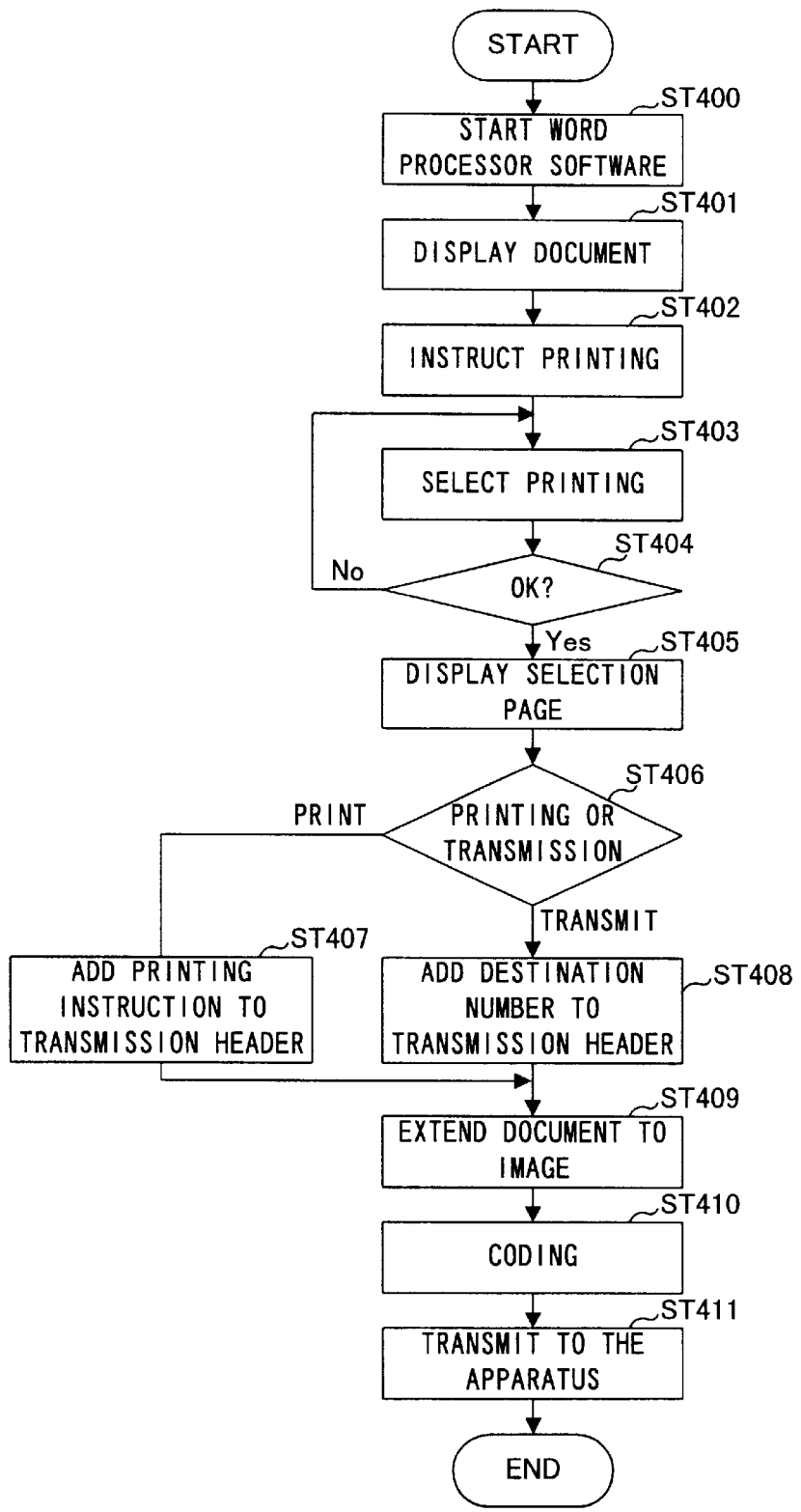
FIG. 5 is a flowchart of an operation in the client machine according to the above embodiment.

An operation of client machine 202 according to the embodiment will be described next. FIG. 5 is a flowchart for transferring a document at client machine 202 to the network facsimile apparatus by a printer driver.

Assume that word processor software is started and a document is generated at client machine 202 (ST400 and ST401). The following description illustrates the case of requesting printing or transmission of the word-processor-document to the network facsimile apparatus.

Figure 6:
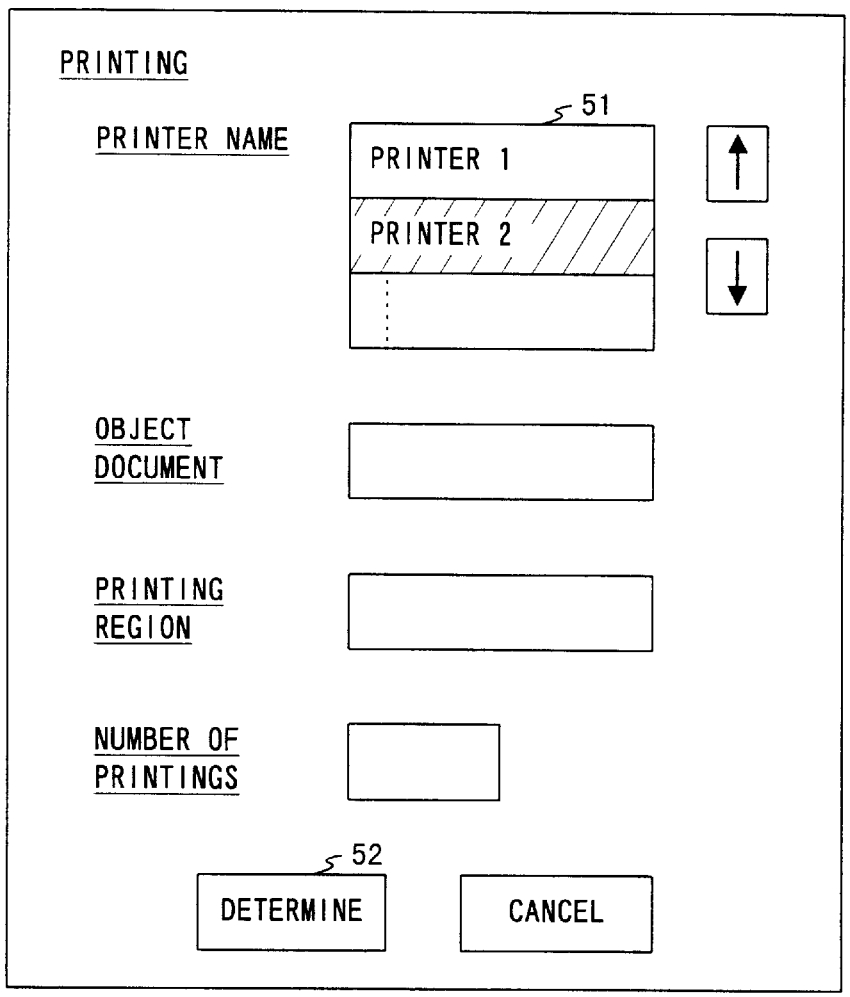
FIG. 6 is a structure diagram of a printing setting page displayed at word processor software.

When a user enters a printing instruction on the word processor software at client machine 202 with the document (word-processor-document) displayed, a printer driver (actually, names of corresponding printers) list page is displayed. FIG. 6 illustrates a display example of the printer driver list page. In FIG. 6, a printer to be used is selected among from printer list 51. A printer driver for using the network facsimile apparatus as a printer is installed in advance at client machine 202. The user selects this printer driver. When the network facsimile is registered as "printer 2", the user selects printer 2 and pushes determine-button 52 (ST403, ST404).

Figure 7:
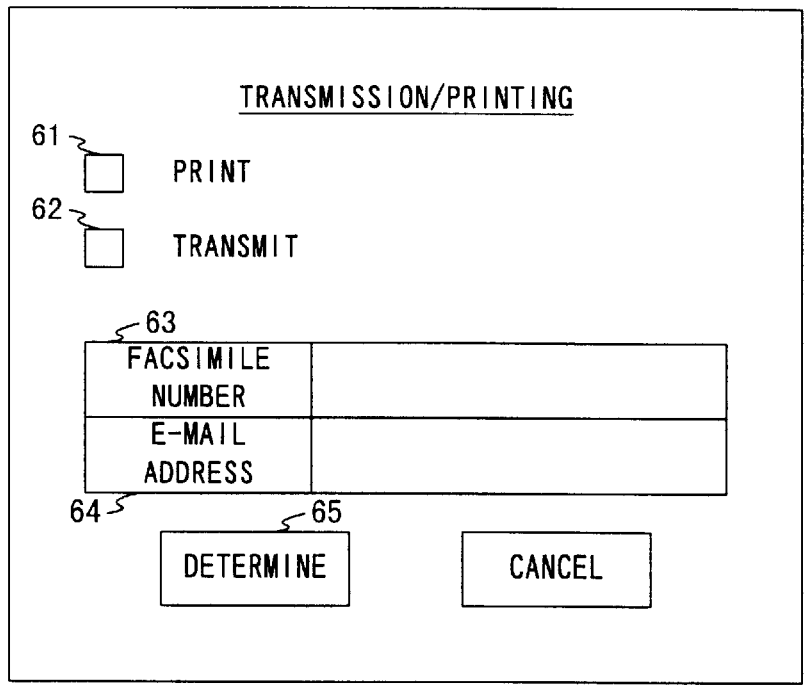
FIG. 7 is a structure diagram of a selection page displayed by a printer driver.

When printer 2 is selected and determine-button 52 is selected, the printer driver for using the network facsimile apparatus as a printer is started. This printer driver displays a selection page in order to enable the user to select either processing of "printing" or "transmission" (ST405). FIG. 7 illustrates a structure example of the selection page. As illustrated in FIG. 7, the selection page has check box 61 used to instruct processing for printing and check box 62 used to request processing for transmission. The selection page further has box 63 used to enter a FAX number of a transmission destination and box 64 used to enter an e-mail address of a transmission destination. In the case where the users checks transmission check box 62, the user enters a FAX number in box 63 when a destination is a facsimile apparatus, and enters an e-mail address in box 64 when a destination is an e-mail apparatus. When determine-button 65 is pushed, the instruction of transmission/printing is confirmed and the destination is further confirmed in the case of transmission.

At ST406, it is decided whether to print or transmit based on the confirmed data entered on the selection page. When printing check box 61 is checked, a printing instruction is provided. In the case of the printing instruction, a transmission header to which the printing instruction is inserted is generated (ST407). In addition, transmission check box 62 is checked, a transmission instruction is provided.

In the case of the transmission instruction, a transmission header to which the transmission instruction and a destination number (FAX number or e-mail address) is generated (ST408).

A document (word-processor-document) generated in character code is extended to a bitmap image (ST409), the bitmap image is further coded in accordance with facsimile communication format (ST410). The coded document is provided with the transmission header generated as described above, and the resultant data is transferred to the network facsimile apparatus (ST411).

On the other hand, in the network facsimile apparatus, network printer daemon 15 detects a reception (1pd) from the printer driver which is for the network facsimile apparatus and installed at client machine 202 (ST701).

Communication control section 16 at network printer daemon 15 analyzes the transmission header of the transmission data transmitted from client machine 202 (ST702). When the transmission data is transmitted from the printer driver for the network facsimile apparatus at client machine, it is possible to decide the designated processing content because a printing instruction or a transmission instruction is inserted to the transmission header.

Storage processing section 17 at network printer daemon 15 executes the processing for storing a coded document that is a main frame of the transmission data in external storage 4 (ST703). Storage processing section 17 requests TIFF conversion section 14 to convert the coded document into a TIFF file and stores the TIFF file of the coded document in external storage 4. A document number is provided to a document to be stored in external storage 4. The document number is notified to communication control section 16 at network printer daemon 15.

On the other hand, communication control section 16 confirms the processing content based on the header analyzed result at ST702 (ST704). In the case of printing instruction, communication control section 16 notifies spooler 18 at printer 6 of the document number to instruct the printing (ST705). Spooler 18 requests a document corresponding to the document number to file management section 36 to fetch from external storage 4. Since a document stored in external storage 4 is coded by client machine 202, the data is expanded at compression/expansion section 8 and then spooled. The document spooled at spooler 18 is provided to printing processing section 19 and then printed (ST706).

As described above, when the network facsimile apparatus receives a printing instruction from the terminal (202) connected to the network facsimile through a network, it is possible to operate the network facsimile apparatus as a network printer.

On the other hand, when the decision at ST704 is a transmission instruction, it is decided whether the instruction is facsimile transmission or e-mail transmission.

When a facsimile number is entered in enter box 63 on the selection page, the facsimile number contained in the transmission header is detected (ST707). In addition, an e-mail address is entered in enter box 64 on the selection page, the e-mail contained in the transmission header is detected (ST707). When the facsimile number is detected at ST707, communication control section 16 notifies FAX/speech communication section 9 of a document number and a facsimile number of the document to be transmitted to instruct the transmission (ST708). FAX/speech communication section 9 requests the document corresponding to the document number to file management section 36 to fetch, and dials to the facsimile number inserted in the header so as to transmit the document after the line is established (ST709). Since a document stored in external storage 4 is coded from bitmap image in accordance with facsimile communication, it is possible to transmit the document by facsimile without any conversion.

In addition, it is decided whether to transmit by e-mail immediately after a facsimile number is not detected at ST707 or after FAX transmission is performed when the facsimile number is detected (ST710). when an e-mail address is detected in the transmission header, processing is executed to transmit a document received from a client by e-mail. In other words, communication control section 16 at network printer daemon 15 provides a document number and an e-mail address to e-mail communication section 13 to instruct the transmission (ST711). E-mail communication section 13 request a document corresponding to the notified document number to file management section 36 to fetch. A document is in TIFF format but binary data in accordance with facsimile communication. Therefore, the document is converted into character code in accordance with SMTP (ST712). The notified e-mail address is set at an e-mail header of e-mail, and the document (TIFF file) is attached to the e-mail then transmitted by e-mail (ST713).

As described above, when the network facsimile apparatus receives a transmission instruction form the terminal (202) connected to the network facsimile apparatus via a network, it is possible to transmit a document using the network facsimile apparatus as a relay apparatus without converting the document into an e-mail at client machine 202.

Figure 8:
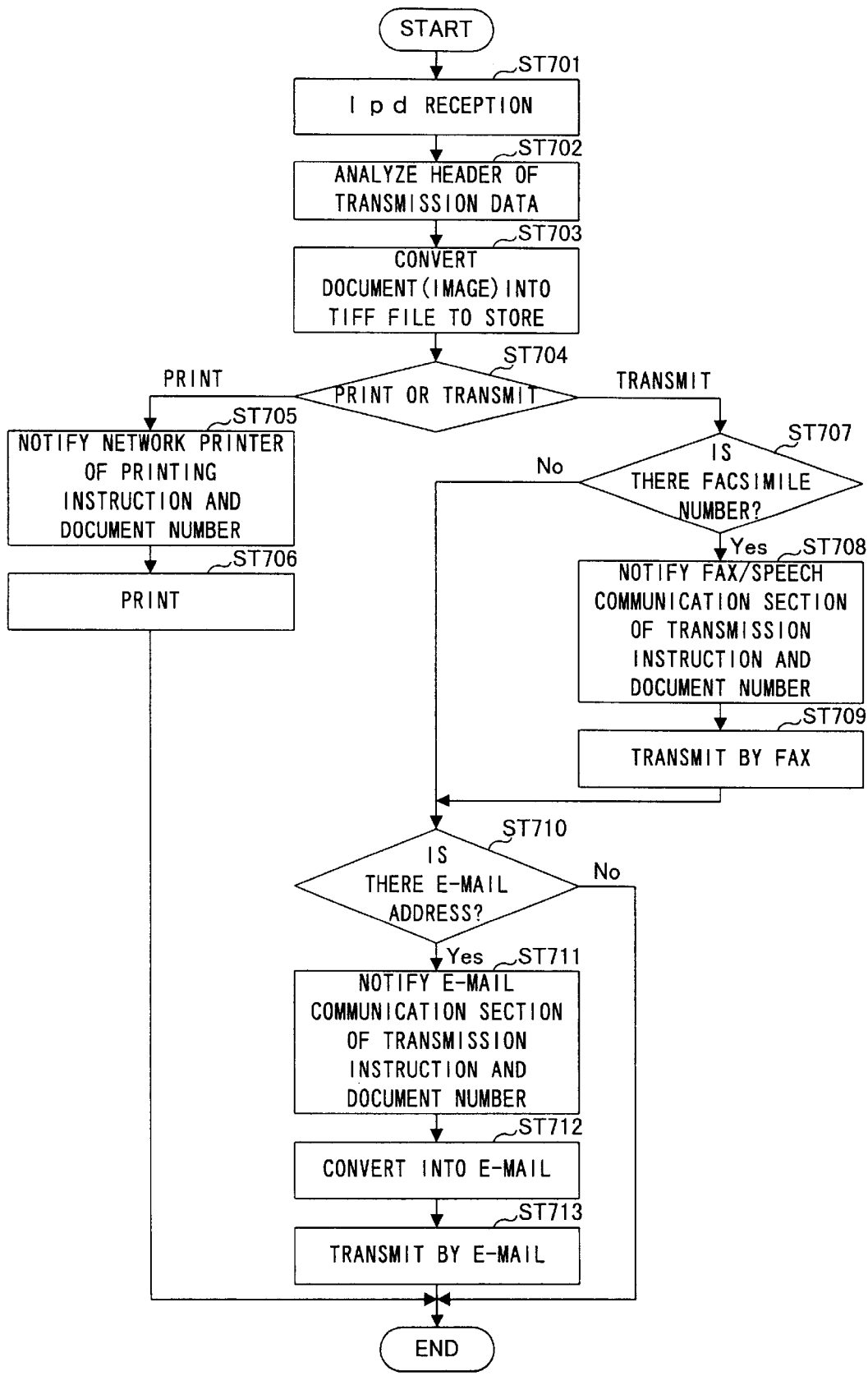
FIG. 8 is a flowchart of an operation in the network facsimile apparatus according to the above embodiment.

In addition, the flowchart in FIG. 8 illustrates the case of storing the printed document in external storage 4, however it may be possible to enable a user to select printing only or storing only. Device setting of the facsimile apparatus is performed using a device setting CGI application at WWW server section 12. Client machine 202 starts the device setting CGI application, and registers either of (a) print, (b) storing only, or (c) printing and storing to a setting table. A setting file containing the setting table is stored in external storage 4. When a document is fetched from external storage 4, FAX/speech communication section 9 and e-mail communication section 13 confirm the setting content of the setting table described above. According to the aforementioned processing, it is possible to select either of printing only, storing only or printing and storing.

In addition, as illustrated in FIG. 5, when a document transmitted by the printer driver for the network facsimile apparatus from client machine 202 is stored in external storage 4, the document number is registered to a document list of a bulletin board. Communication control section 16 at network printer daemon 15 notifies document list generating section 37 of the document number of the document stored in external storage 4. Document list generating section 37 registers the document number to the document list of bulletin board composed of HTML files.

According to the aforementioned processing, it is possible to display the document list by that client machine 202 starts the WWW browser and provides a file request for bulletin board html to WWW server section 12.

In the flowchart in FIG. 5, a document is transferred to the network facsimile apparatus by a printing instruction or transmission instruction. However, it may be possible to enable the printer driver to transfer a document only for the registration to the bulletin board. In this case, a check box of "bulletin board registration" is provided on the selection page in FIG. 7, the printer driver for the network facsimile detects the check, and provides a document provided with transmission head to which "bulletin board registration instruction" is inserted to network facsimile daemon 15. When network printer daemon 15 detects "bulletin board registration instruction" from the transmission header, network printer daemon 15 stores the data in external storage 4 while notifies document list generating section 37 of the document number.

The present invention is not limited to the above described embodiments, and various variations and modifications may be possible without departing from the scope of the present invention.

This application is based on the Japanese Patent Application No.HEI 11-18930 filed on Jan. 27, 1999, entire content of which is expressly incorporated by reference herein.

What is claimed is:

1. A network facsimile apparatus connected to a telephone network and to a computer network, a client machine being connected to the network facsimile apparatus via the computer network, the network facsimile apparatus comprising:
   a data communicator that receives bitmap image data transmitted by the client machine via the computer network, the received bitmap image data including a transmission header that includes instruction data;
   an analyzer that analyzes the instruction data in the transmission header of the received bitmap image data and determines an indication of at least one of a printing, a facsimile transmission, and an e-mail transmission;
   a converter that converts the bitmap image data into a TIFF file;
   a facsimile transmitter that converts the TIFF file into facsimile data, and transmits the converted facsimile data to a facsimile destination terminal when said analyzer determines that the instruction data indicates facsimile transmission, a facsimile number of the facsimile destination terminal being included in the transmission header;
   said data communicator transmitting the TIFF file to an e-mail destination terminal when said analyzer determines that the instruction data indicates an e-mail transmission, an e-mail address of the e-mail destination terminal being included in the transmission header; and
   a printer that prints the TIFF file when said analyzer determines that the instruction data indicates printing.

2. The network facsimile apparatus according to claim 1 further comprising a memory configured to store the TIFF file converted by said converter.

3. The network facsimile apparatus according to claim 1, wherein the instruction data includes a printing region of the bitmap image data.

4. The network facsimile apparatus according to claim 1, wherein the instruction data includes a number of printings of the bitmap image data.

5. The network facsimile apparatus according to claim 1, wherein, when said data communicator receives the transmission header including a facsimile number and an e-mail address, the received bitmap image data is transmitted to a facsimile destination terminal by said facsimile transmitter and is transmitted to an e-mail destination terminal by said data communicator in a single communication operation.

6. A method of transmitting data by a network facsimile apparatus that is connected to a telephone network and to a computer network, a client machine being connected to the network facsimile apparatus via the computer network, the method of transmitting data comprising:
   receiving bitmap image data transmitted by the client machine via the computer network, the bitmap image data including a transmission header that includes instruction data;
   analyzing the instruction data in the transmission header and determining an indication of at least one of printing, facsimile transmission and e-mail transmission;
   converting the bitmap image data into a TIFF file;
   converting the TIFF file into facsimile data and transmitting the converted facsimile data to a facsimile destination terminal when the analyzing determines that the instruction data of the transmission header indicates facsimile transmission, a facsimile number of the facsimile destination terminal being included in the transmission header;
   transmitting the TIFF file to an e-mail destination terminal when the analyzing determines that the instruction data of the transmission header indicates e-mail transmission, an e-mail address of the e-mail destination terminal being included in the transmission header; and
   printing the TIFF file when the analyzing determines that the instruction data of the transmission header indicates printing.

7. The method according to claim 6, further comprising storing the converted TIFF file in a memory.

8. The method according to claim 6, wherein the instruction data includes a printing region of the bitmap image data.

9. The apparatus according to claim 6, wherein the instruction data includes a number of printings of the bitmap image data.

10. The apparatus according to claim 6, wherein when the received transmission header includes a facsimile number and an e-mail address, the received bitmap image data is transmitted to a facsimile destination terminal and to an e-mail destination terminal in a single communication operation.

* * * * *